(12) United States Patent
Eisenhour

(10) Patent No.: US 7,743,627 B2
(45) Date of Patent: Jun. 29, 2010

(54) VEHICLE AIR CONDITIONING SYSTEM

(75) Inventor: Ronald Eisenhour, West Bloomfield, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 995 days.

(21) Appl. No.: 11/200,065

(22) Filed: Aug. 10, 2005

(65) Prior Publication Data

US 2007/0033966 A1  Feb. 15, 2007

(51) Int. Cl.
   *F25B 1/10* (2006.01)

(52) U.S. Cl. .................. 62/510; 62/228.5; 415/206; 60/39.01

(58) Field of Classification Search ............. 62/228.5, 62/510; 415/206; 180/65.23, 65.27, 65.28; 237/12.1; 60/39.01
See application file for complete search history.

(56) References Cited

U.S. PATENT DOCUMENTS

| | | | |
|---|---|---|---|
| 3,820,924 A | | 6/1974 | Cassidy |
| 4,594,858 A | * | 6/1986 | Shaw .................. 62/175 |
| 5,304,033 A | * | 4/1994 | Tang .................... 415/206 |
| 6,272,871 B1 | | 8/2001 | Eisenhour |
| 6,554,088 B2 | * | 4/2003 | Severinsky et al. ...... 180/65.23 |
| 6,637,230 B2 | * | 10/2003 | Iwanami et al. ........... 62/244 |
| 6,889,512 B2 | * | 5/2005 | Ebara et al. ............... 62/244 |
| 7,104,347 B2 | * | 9/2006 | Severinsky et al. ...... 180/65.23 |
| 7,237,634 B2 | * | 7/2007 | Severinsky et al. ...... 180/65.23 |
| 7,392,871 B2 | * | 7/2008 | Severinsky et al. ...... 180/65.28 |
| 7,416,137 B2 | * | 8/2008 | Hagen et al. ............. 60/39.01 |
| 7,455,134 B2 | * | 11/2008 | Severinsky et al. ...... 180/65.28 |
| 7,520,353 B2 | * | 4/2009 | Severinsky et al. ...... 180/65.28 |
| 7,559,388 B2 | * | 7/2009 | Severinsky et al. ...... 180/65.28 |
| 7,597,164 B2 | * | 10/2009 | Severinsky et al. ...... 180/65.27 |
| 2004/0007006 A1 | * | 1/2004 | Ebara et al. ................. 62/244 |
| 2004/0020229 A1 | * | 2/2004 | Adachi et al. .............. 62/236 |
| 2005/0109499 A1 | * | 5/2005 | Iwanami et al. ............ 165/202 |

* cited by examiner

*Primary Examiner*—Ljiljana (Lil) V Ciric
(74) *Attorney, Agent, or Firm*—Global IP Counselors, LLP

(57) ABSTRACT

A vehicle air conditioning system includes a pressure reducing device that is operatively coupled to a condenser downstream therefrom. An evaporator is operatively coupled to the pressure reducing device downstream therefrom. A refrigerant flow booster is operatively coupled to the evaporator downstream therefrom and a compressor is operatively coupled to the refrigerant flow booster downstream therefrom, the compressor also being operatively coupled to the condenser upstream therefrom. The refrigerant flow booster increases the flow of gaseous refrigerant to the compressor, in particular, when the compressor is operating at slower speeds.

20 Claims, 9 Drawing Sheets

VEHICLE AIR CONDITIONING SYSTEM

BACKGROUND OF THE INVENTION

1. Field of the Invention

The present invention generally relates to a vehicle air conditioning system. More specifically, the present invention relates to a vehicle air conditioning system that includes a refrigerant flow booster for increasing the flow of refrigerant to an air conditioning compressor.

2. Background Information

A typical automobile air conditioner includes a compressor, a condenser, an expansion valve or orifice tube, and an evaporator. The compressor compresses a cool vapor-phase refrigerant (e.g., Freon, R134a) to heat the same, resulting in a hot, high-pressure vapor-phase refrigerant. This hot vapor-phase refrigerant runs through a condenser, typically a coil that dissipates heat. The condenser condenses the hot vapor-phase refrigerant into liquid refrigerant. The liquid refrigerant is throttled through an expansion valve, which evaporates the refrigerant to a cold, low-pressure saturated liquid-vapor-phase refrigerant. This cold saturated liquid-vapor-phase refrigerant runs through the evaporator, typically a coil that absorbs heat from the air fed to the passenger compartment.

The compressor is typically configured to operate at variable speeds, corresponding to the varying speeds of the power source within the vehicle. Often, the compressor is driven by the vehicle's engine. In stop and go traffic, a vehicle engine is often operating for extended periods of time at idling speed or close to idling speeds. Thus, sometimes the compressor operates at low speeds that correspond to the engine speed. At low speeds the compressor may not generate sufficient suction power at its inlet to draw in necessary amounts of gaseous refrigerant. As a result, the air conditioning system may not operate optimally.

In view of the above, it will be apparent to those skilled in the art from this disclosure that there exists a need in a vehicle air conditioning system for improved gaseous refrigerant flow into the inlet of the compressor under certain operating conditions. This invention addresses this need in the art as well as other needs, which will become apparent to those skilled in the art from this disclosure.

SUMMARY OF THE INVENTION

It has been discovered that by increasing the flow of gaseous refrigerant into a compressor of a vehicle air conditioning system at low compressor operating speeds, the cooling capacity of the air conditioning system can be improved.

One object of the present invention is to provide a vehicle air conditioning system that is configured to increase the flow of refrigerant from the evaporator and into the compressor, preferably at low operating compressor speeds.

In accordance with one aspect of the present invention, a vehicle air conditioning system is provided that includes a condenser, a pressure reducing device, an evaporator, a refrigerant flow booster and a compressor. The condenser is configured to receives a refrigerant in a compressed state and remove heat from at least a portion of the refrigerant. The pressure reducing device is in fluid communication with the condenser to receive the refrigerant, and is configured to reduce pressure of the refrigerant from the condenser. The evaporator is in fluid communication with the pressure reducing device to receive the refrigerant, and configured to evaporate at least a portion of the refrigerant. The refrigerant flow booster is in fluid communication with the evaporator, and configured to boost the pressure of the refrigerant from the evaporator. The compressor is in fluid communication with the refrigerant flow booster, and is configured to compress the refrigerant and deliver the refrigerant in the compressed state to the condenser.

The refrigerant flow booster is configured and arranged to increase the flow of refrigerant from the evaporator and into the compressor, preferably at low operating compressor speeds. The compressor and refrigerant flow booster can be assembled in a single mechanism. Alternatively, the compressor and refrigerant flow booster can be separate devices connected to one another by a refrigerant conduit or line.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
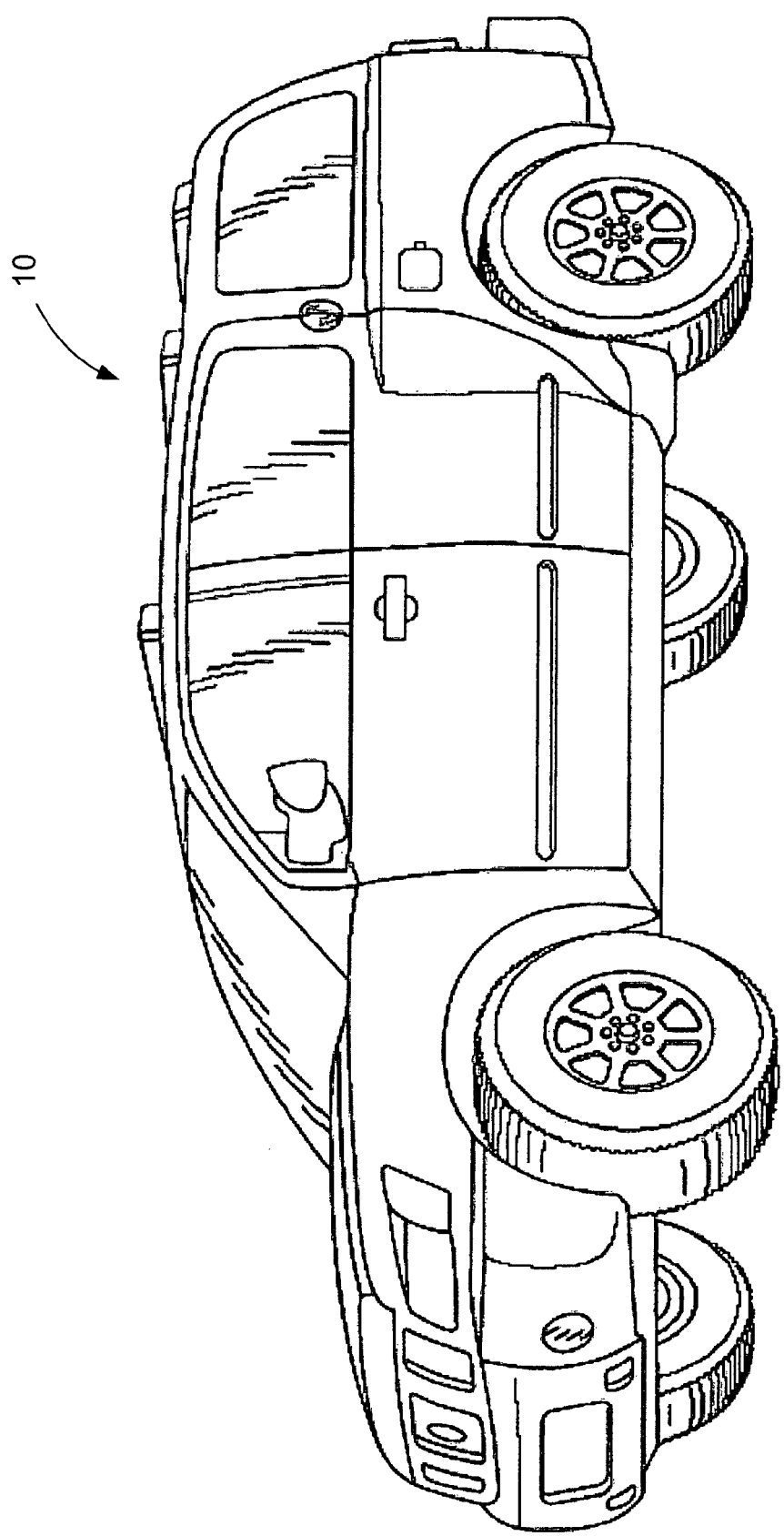
FIG. 1 is a perspective view of a vehicle that includes an air conditioning system in accordance with the present invention.
Figure 2:
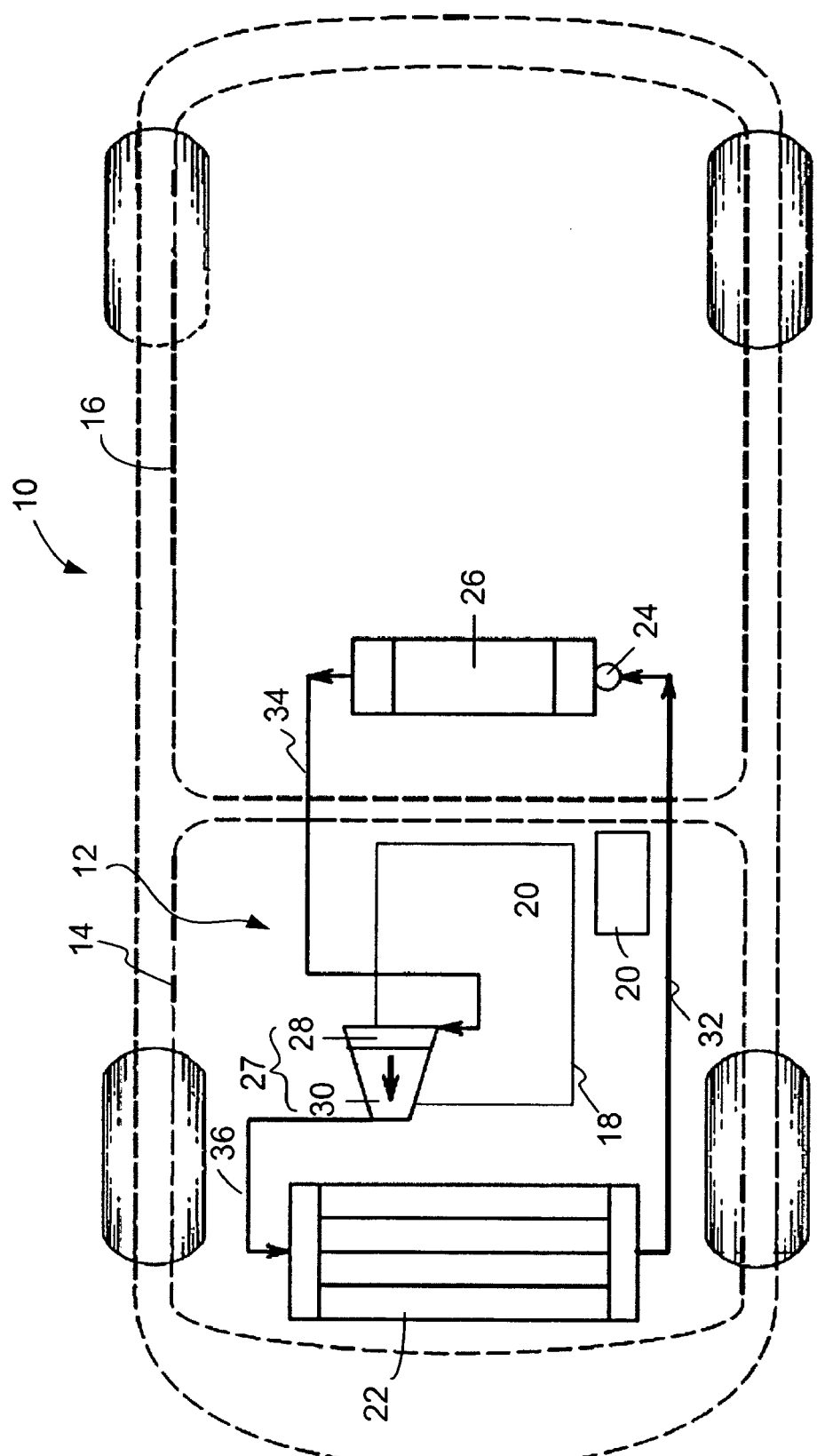
FIG. 2 is a simplified, schematic top plan view of the vehicle and the components of the air conditioning system in accordance with the present invention.

Referring initially to FIGS. 1 and 2, a vehicle 10 is illustrated that includes a vehicle air conditioning system 12 in accordance with a first embodiment of the present invention. The vehicle 10 also includes an engine compartment 14, a passenger compartment or vehicle cabin 16, an engine 18 and a battery 20. The engine 18 and the battery 20 are first and second power sources, respectively, and are both preferably disposed within the engine compartment 14. The vehicle 10 also includes many conventional components, such as a drive train, a suspension assembly and a steering assembly as well as other conventional components. A description of these conventional components is omitted for the sake of brevity.

The vehicle air conditioning system 12 has a refrigerant circuit that basically includes a condenser 22, a pressure reducing device 24, an evaporator 26, and a compressor assembly 27 (a refrigerant flow booster 28 and a compressor 30). The components 22, 24 and 26 are conventional components that are well known in the air conditioning field. Since these components 22, 24 and 26 are well known in the air conditioning field, the precise construction of the components 22, 24 and 26 will not be discussed or illustrated in detail herein. While the combination and arrangement of the refrigerant flow booster 28 and the compressor 30 is unique as explained herein, flow boosters and compressors are generally well know components. The operations of the air conditioning system 12 are controlled by a set of operator controls (not shown) that are located in the vehicle cabin 16. The operator controls typically will include an ON/OFF switch, a temperature control and a blower of fan speed control. Once the operator turns on the air conditioning system 12, a control signal is received by a computer controller (not shown) of the computer or engine control unit to regulate the air temperature in the passenger compartment or vehicle cabin 16. In other words, the computer controller operates the air conditioning system 12 in accordance with the settings of the operator controls. Since the controls and general operation of air conditioning system are well known the controls and general operation of air conditioning system 12 will not be discussed or illustrated in further detail herein.

In the first embodiment of the present invention, the refrigerant flow booster 28 and the compressor 30 are assembled as a single integrated unit or apparatus. As described in greater detail below, the refrigerant flow booster 28 provides a more steady flow of refrigerant to the compressor 30 thereby increasing the cooling effectiveness of the air conditioning system 12, in particular at low compressor speeds (low power levels). In this embodiment, the compressor 30 is preferably mounted on the engine 18 within the engine compartment 14. The compressor 30 receives rotary power from the engine 18 in a conventional manner, as explained below. Alternatively, the compressor 30 can be mounted anywhere within the vehicle 10 and can be provided with an alternative power source, such as an electric motor as explained in a later embodiment.

Figure 3:
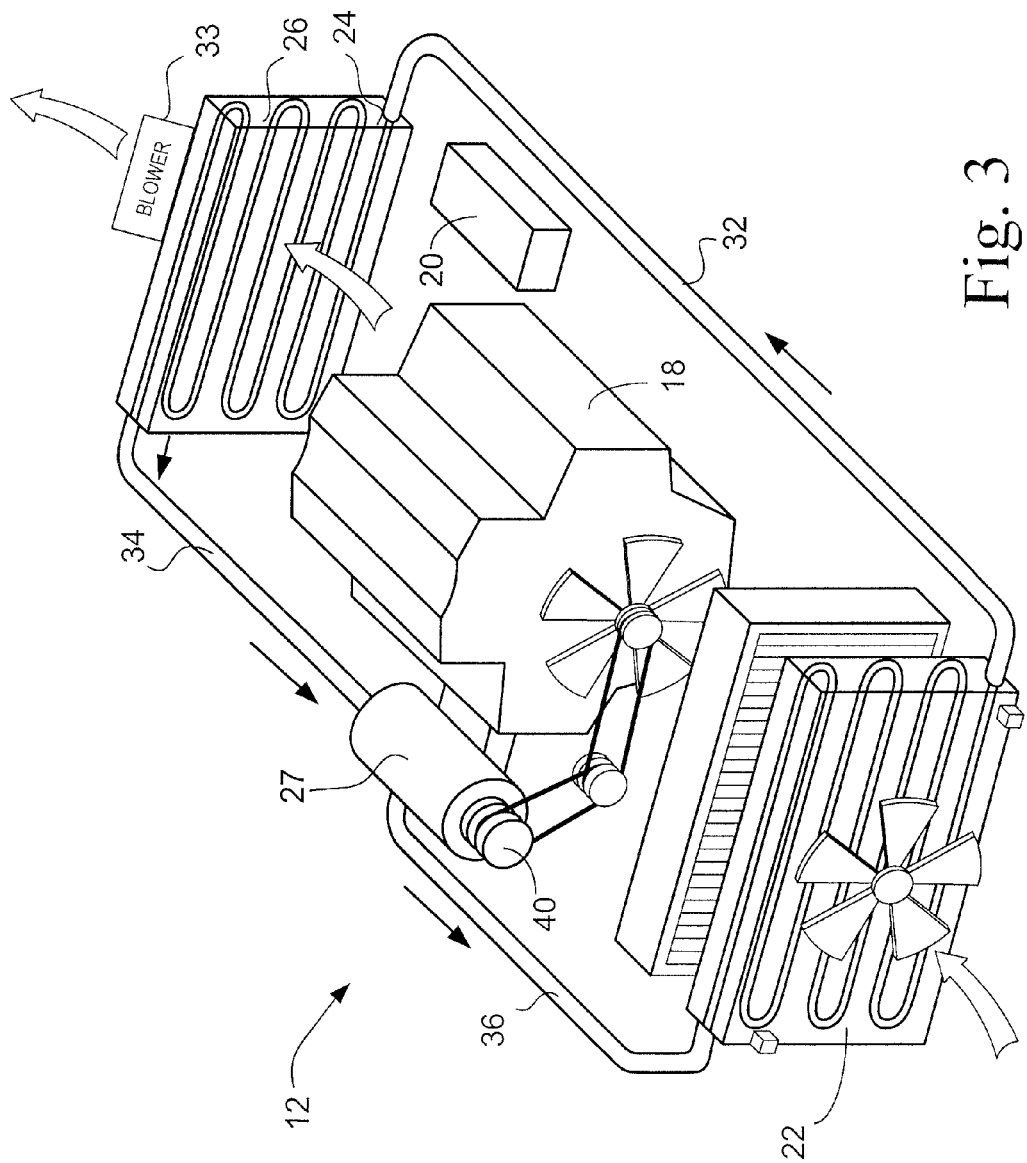
FIG. 3 is a simplified, perspective view of selected portions of the vehicle air conditioning system including a compressor assembly with a compressor and a refrigerant flow booster in accordance with a first embodiment of the present invention.

Still referring to FIGS. 2 and 3, the condenser 22 is also disposed within the engine compartment 14. The condenser 22 is preferably mounted in the engine compartment 14 in front of the engine 18. Thus, the condenser 22 is positioned to receive a flow of air as the vehicle 10 moves for dissipation of heat. Additionally, the condenser 22 can be provided with a conventional circulating fan (FIG. 3) that provides additional air flow through the condenser 22. The condenser 22 condenses the hot vapor-phase refrigerant into a liquid-phase refrigerant or a saturated liquid-vapor-phase refrigerant. In the preferred embodiment of the present invention, the condenser 22 condenses the refrigerant by air cooling using a circulating fan. Thus, the condenser 22 of the preferred embodiment can be referred to as a heat removal device.

The pressure reducing device 24 and the evaporator 26 are preferably positioned in a forward location within the vehicle cabin 16. The pressure reducing device 24 is operatively coupled to the condenser 22 downstream there from by a high pressure line 32. In other words, the pressure reducing device 24 is in fluid communication with the condenser 22 to receive the refrigerant, and reduce the pressure of the refrigerant from the condenser 22. The pressure reducing device 24 can be an orifice tube, expansion valve or other conventional gas expansion device that allows refrigerant to expand to a low pressure state for absorption of heat downstream thereof in the evaporator 26. The pressure reducing device 24 can function automatically or can be remotely controlled by a controller (not shown). As shown in FIG. 3, typically, the evaporator 26 is provided with a circulating fan 33 that draws air through the evaporator 26 and blows the cool air into the vehicle cabin 16. Thus, the circulating fan 33 assists the evaporator 26 in absorbing heat from within the vehicle cabin 16 to cool the vehicle cabin 16.

The evaporator 26 is operatively coupled to the pressure reducing device 24 downstream from therefrom. In other words, the evaporator 26 is in fluid communication with the pressure reducing device 24 to receive the refrigerant. The evaporator 26 is configured to evaporate at least a portion of the refrigerant. In the depicted embodiment, the pressure reducing device 24 is disposed adjacent to the evaporator 26. Alternatively, the pressure reducing device 24 can be separated from the evaporator 26 and connected thereto via a low pressure line (not shown). In any case, as high pressure refrigerant passes through the pressure reducing device 24, the refrigerant expands and drops in temperature entering into a low pressure state in the evaporator 26. In the evaporator 26, the low pressure (low temperature) refrigerant absorbs heat from the passenger compartment 16 to cool the vehicle cabin 16. Thereafter, a low pressure line 34 conveys low pressure refrigerant from the evaporator 26 to the compressor assembly 27 of the vehicle air conditioning system 12.

The compressor assembly 27 is disposed between the condenser 22 and the evaporator 26. In particular, the compressor assembly 27 is operatively coupled to the evaporator 26 downstream therefrom by the low pressure line 34 such that the evaporator 26 is in direct fluid communication with the refrigerant flow booster 28 of the compressor assembly 27. Further, the condenser 22 is in direct fluid communication with the compressor 30 of the compressor assembly 27 via a high pressure line 36.

In normal operation of the air conditioning system 12, the compressor assembly 27 compresses refrigerant which is then fed to the condenser 22 via the high pressure line 36. Heat is allowed to dissipate from the refrigerant while in the condenser 22. Thereafter, the refrigerant travels through the high pressure line 32 to the pressure reducing device 24. The refrigerant expands preferably into a gaseous state at the pressure reducing device 24 and is then fed into the evaporator 26 where it absorbs heat from the vehicle cabin 16.

Figure 4:
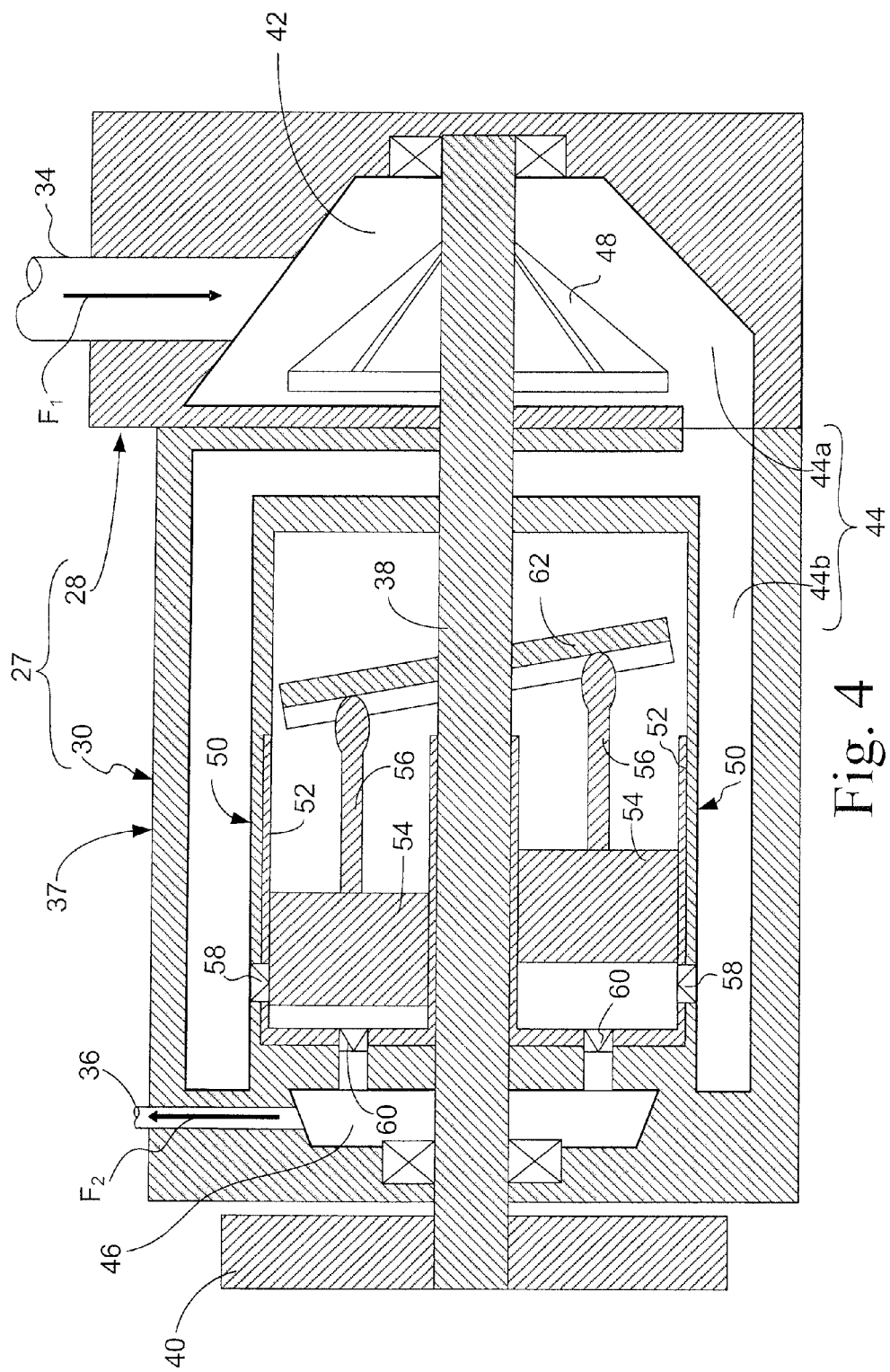
FIG. 4 is a longitudinal cross-sectional view of the compressor assembly depicted in FIG. 3, showing the compressor and the refrigerant flow booster in accordance with the first embodiment of the present invention.

In accordance with the first embodiment of the present invention, the refrigerant flow booster 28 and the compressor 30 are integrated into a single unit or mechanism within a housing 37, specifically the compressor assembly 27, as shown in FIG. 4. The compressor assembly 27 basically includes a drive shaft 38 and a clutch and pulley assembly 40 for operating the refrigerant flow booster 28 and the compressor 30. The drive shaft 38 extends through the housing 37. Specifically, the drive shaft 38 extends from the compressor 30 to the refrigerant flow booster 28 providing rotary power to both. The refrigerant flow booster 28 has a booster chamber 42 that is in direct fluid communication with the interior of the compressor 30 via a refrigerant passageway 44. The refrigerant passageway 44 is completely contained within the housing 37. The refrigerant passageway includes an outlet portion 44a that exhausts refrigerant from the refrigerant flow booster 28 and an inlet portion 44b that directs the refrigerant exiting from the refrigerant flow booster 28 to the compressor 30. In other words, refrigerant flows from the outlet portion 44a directly into the inlet portion 44b. The compressor 30 has an outlet 46 that is in direct fluid communication with the high pressure line 36 for expelling high pressure refrigerant from the compressor 30. The clutch and pulley assembly 40 are selectively rotated in a conventional manner by rotary power from the engine 18, as indicated in FIG. 3. Rotation of the clutch and pulley assembly 40 in turn rotates the drive shaft 38.

The refrigerant flow booster 28 basically includes an impeller 48 that is disposed within the booster chamber 42. The impeller 48 is fixedly attached to the drive shaft 38 for rotation therewith. The low pressure line 34 is connected to the booster chamber 42 thereby allowing the entry of low pressure refrigerant, as indicated by the arrow $F_1$. As the drive shaft 38 rotates, the impeller 48 also rotates drawing low pressure refrigerant into the compressor assembly 27 and urges the refrigerant into the refrigerant passageway 44. By providing the refrigerant flow booster 28 in the air conditioning system 12 immediately before the compressor 30, a more consistent steady flow of refrigerant is provided to the compressor 30 even at low compressor speeds (low power levels).

The compressor 30 is preferably a conventional compressor that includes, for example, a plurality of piston assemblies 50. Each of the piston assemblies 50 includes a cylinder 52, a piston 54, a cam driven pin 56, an inlet valve 58 and an outlet valve 60. The cam driven pin 56 is contacted by a cam ring 62 fixedly attached to the drive shaft 38 in a conventional manner. The compressor 30 is supplied with refrigerant via the refrigerant passageway 44. The refrigerant is drawn into the piston assemblies 50 through the inlet valves 58, which preferably allow one way flow only of refrigerant. Within the cylinders 52, the pistons 54 compress the refrigerant where it then passes into the outlet 46 through the outlet valves 60 which allow one way flow only of refrigerant. From the outlet 46, the compressed refrigerant flows into the high pressure line 36, as indicated by the arrow F2.

It should be understood from the description herein and the drawings that the compressor 30 of the compressor assembly 27 can be any of a variety of compressor configurations. For instance, the compressor 30 can be a vane type compressor or other conventional gas compressing mechanism suitable for air conditioning systems.

In the above described first embodiment, the refrigerant flow booster 28 is integrated into the compressor assembly 27. However, as described below in further embodiments of the present invention, the refrigerant flow booster 28 can be a separate device from the compressor assembly 27 with a separate power source. Further, the refrigerant flow booster 28 in the first embodiment includes an impellor for increasing refrigerant flow to the compressor 30. Alternatively, the refrigerant flow booster 28 can include any of a variety of flow increasing mechanisms, as described below in further embodiments of the present invention.

The various parts of the vehicle 10 and air conditioning system that are conventional components are well known in the art. Since such parts are well known in the art, these structures will not be discussed or illustrated in detail herein. Rather, it will be apparent to those skilled in the art from this disclosure that the components can be any type of structure that can be used to carry out the present invention.

Second Embodiment

Figure 5:
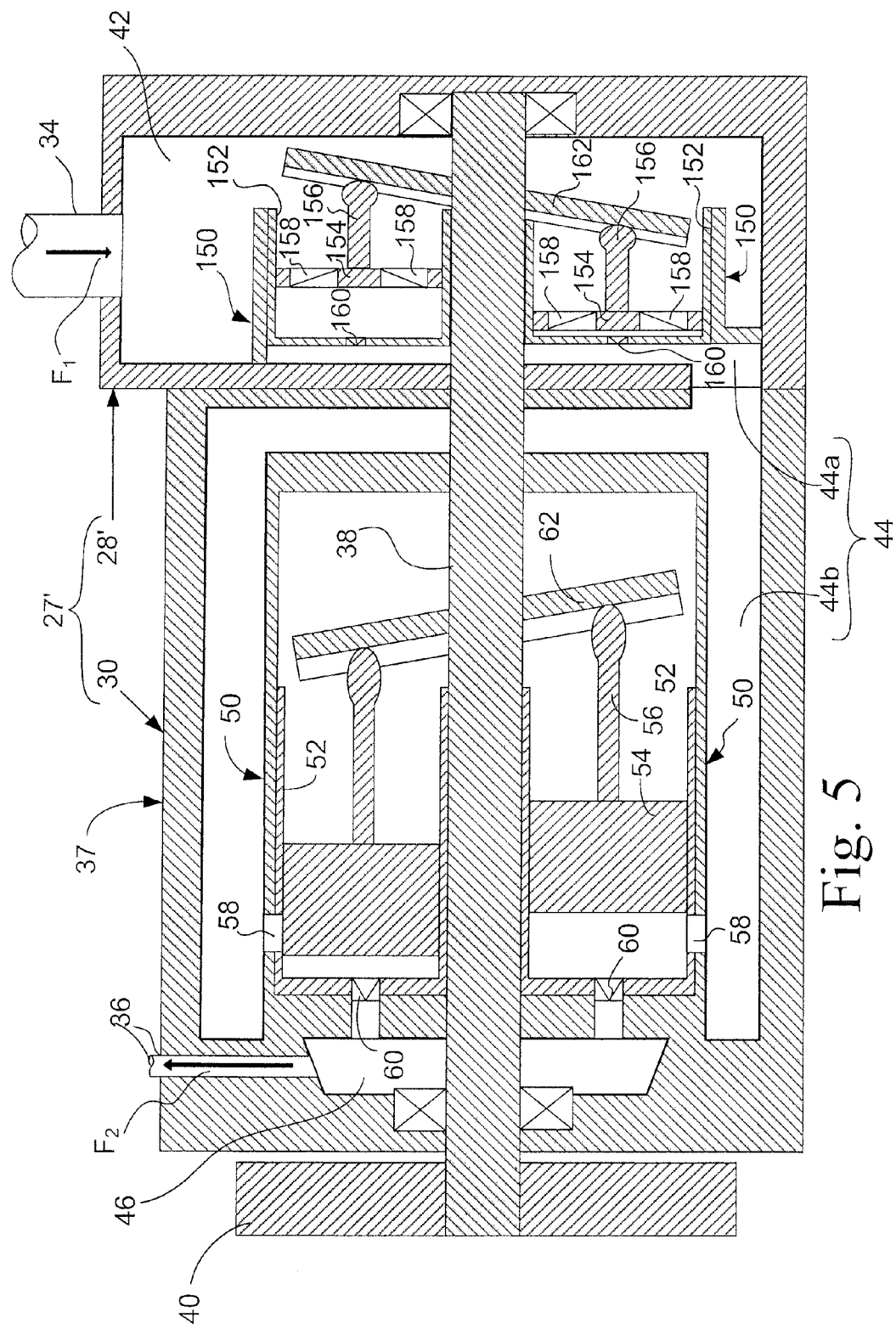
FIG. 5 is a longitudinal cross-sectional view of another compressor assembly, showing a compressor and a refrigerant flow booster in accordance with a second embodiment of the present invention.

Referring now to FIG. 5, a compressor assembly 27' in accordance with a second embodiment will now be explained. Basically, the compressor assembly 27' is installed in the vehicle air conditioning system 12 of the vehicle 10 of FIGS. 1-3 by replacing the compressor assembly 27 with the compressor assembly 27'. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

As shown in FIG. 5, the compressor assembly 27' in accordance with the second embodiment includes a refrigerant flow booster 28' and the compressor 30 of the first embodiment. Since the compressor 30 and it's operation are the same as in the first embodiment, the description of the compressor 30 will not be repeated for the sake of brevity.

The refrigerant flow booster 28' differs from the first embodiment in that the impellor 48 of the first embodiment has been replaced with a piston style booster configuration. Specifically, the refrigerant flow booster 28' of this second embodiment includes at least one piston assembly 150 (two shown in FIG. 5). Each of the piston assemblies 150 includes a cylinder 152, a piston 154, a cam driven pin 156, an inlet valve 158 and an outlet valve 160. The cam driven pin 156 is contacted by a cam ring 162 that is fixedly attached to the drive shaft 38 in a conventional manner. The refrigerant flow booster 28' draws refrigerant into the piston assemblies 150 through the inlet valves 158, which preferably allow one way flow only of refrigerant. The refrigerant flow booster 28' then expels refrigerant into the passageway 44 via the outlet valves 160, which preferably allow one way flow only of refrigerant into the compressor 30. Inclusion of the refrigerant flow booster 28' in the compressor assembly 27' increases the flow of refrigerant to the compressor 30, in particular at low compressor speeds.

It should be understood from the drawings and description herein that the refrigerant flow booster 28' can have any of a variety of configurations. For example, in the embodiment depicted, the piston assemblies 150 are arranged parallel to the shaft 38. Alternatively, the piston assemblies 150 can be oriented at an angle or perpendicular to the shaft 38.

Third Embodiment

Figure 6:
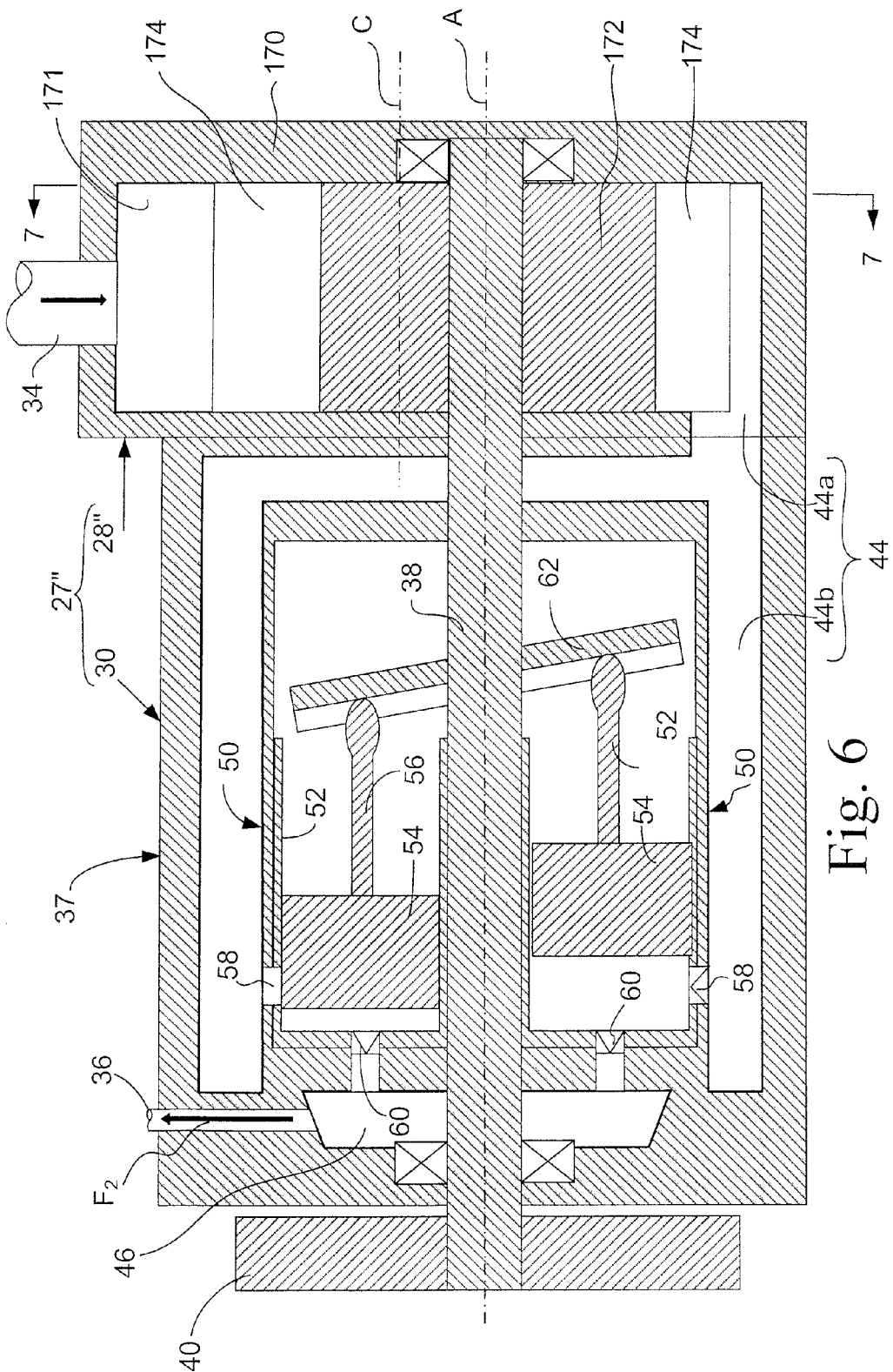
FIG. 6 is a longitudinal cross-sectional view of yet another compressor assembly, showing a compressor and a refrigerant flow booster in accordance with a third embodiment of the present invention.
Figure 7:
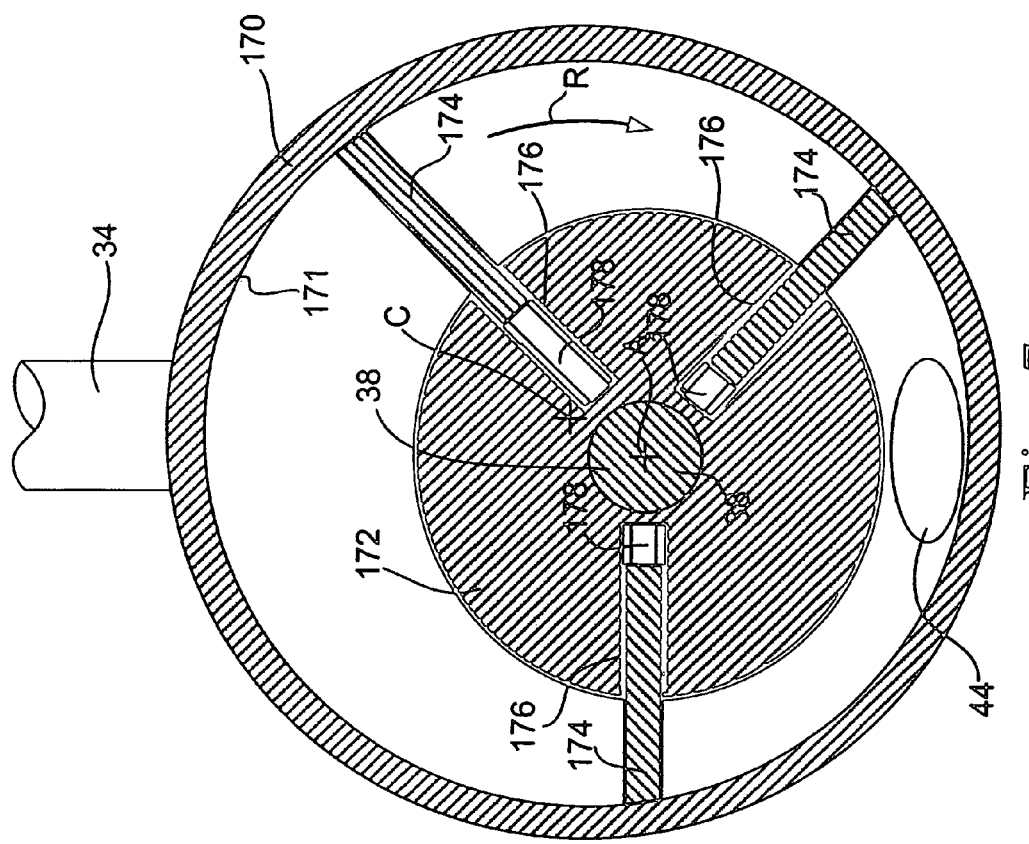
FIG. 7 is a transverse cross-sectional view of the compressor assembly taken along the lines 7-7 in FIG. 6, showing details of the refrigerant flow booster in accordance with the third embodiment of the present invention.

Referring now to FIGS. 6 and 7, a compressor assembly 27" in accordance with a third embodiment will now be explained. Basically, the compressor assembly 27" is installed in the vehicle air conditioning system 12 of the vehicle 10 of FIGS. 1-3 by replacing the compressor assembly 27 with the compressor assembly 27". In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

As shown in FIG. 6, the compressor assembly 27" in accordance with the third embodiment includes a refrigerant flow booster 28" and the compressor 30 of the first embodiment. Again, since the compressor 30 and it's operation are the same as in the first embodiment, the description of the compressor 30 will not be repeated for the sake of brevity.

The refrigerant flow booster 28" differs from the first embodiment in that the impellor 48 of the first embodiment has been replaced with a vane type pump. Specifically as shown more clearly in FIG. 7, the refrigerant flow booster 28" includes a hollow body housing 170, a rotor 172 fixedly attached to the drive shaft 38 and a plurality of vanes 174.

The hollow body housing 170 has a center C and an inner surface 171. The drive shaft 38 rotates about a central axis A. However, the central axis A of the drive shaft 38 is offset from the center C of the hollow body housing 170, as shown in FIG. 7.

As shown in FIG. 7, the rotor 172 is formed with a plurality of slots 176. Within each slot 176 is a biasing member 178, such as a spring or other resilient member or mechanism. The vanes 174 are inserted into respective ones of the slots 176 and are urged by the biasing members 178 to engage the inner surface 171.

Since the rotor 172 is positioned off-axis with respect to the center C of the hollow body housing 170, the volume between adjacent pairs of the vanes 174 and the inner surface 171 varies. As the rotor 172 rotates in a direction R, refrigerant gas is drawn in from the low pressure line 34. The refrigerant gas is slightly compressed between adjacent vanes 174 as the rotor 172 continues to rotate. Once each vane 174 passes over the refrigerant passageway 44, the compressed gas is expelled and enters the compressor 30.

It should be understood from the drawings and description herein, that the refrigerant flow booster 28" of the third embodiment can have any of a variety of configurations of vane type pumps. For instance, the refrigerant flow booster 28" can have two, three, four or more vanes, depending upon the load requirements of the compressor assembly 27".

Fourth Embodiment

Figure 8:
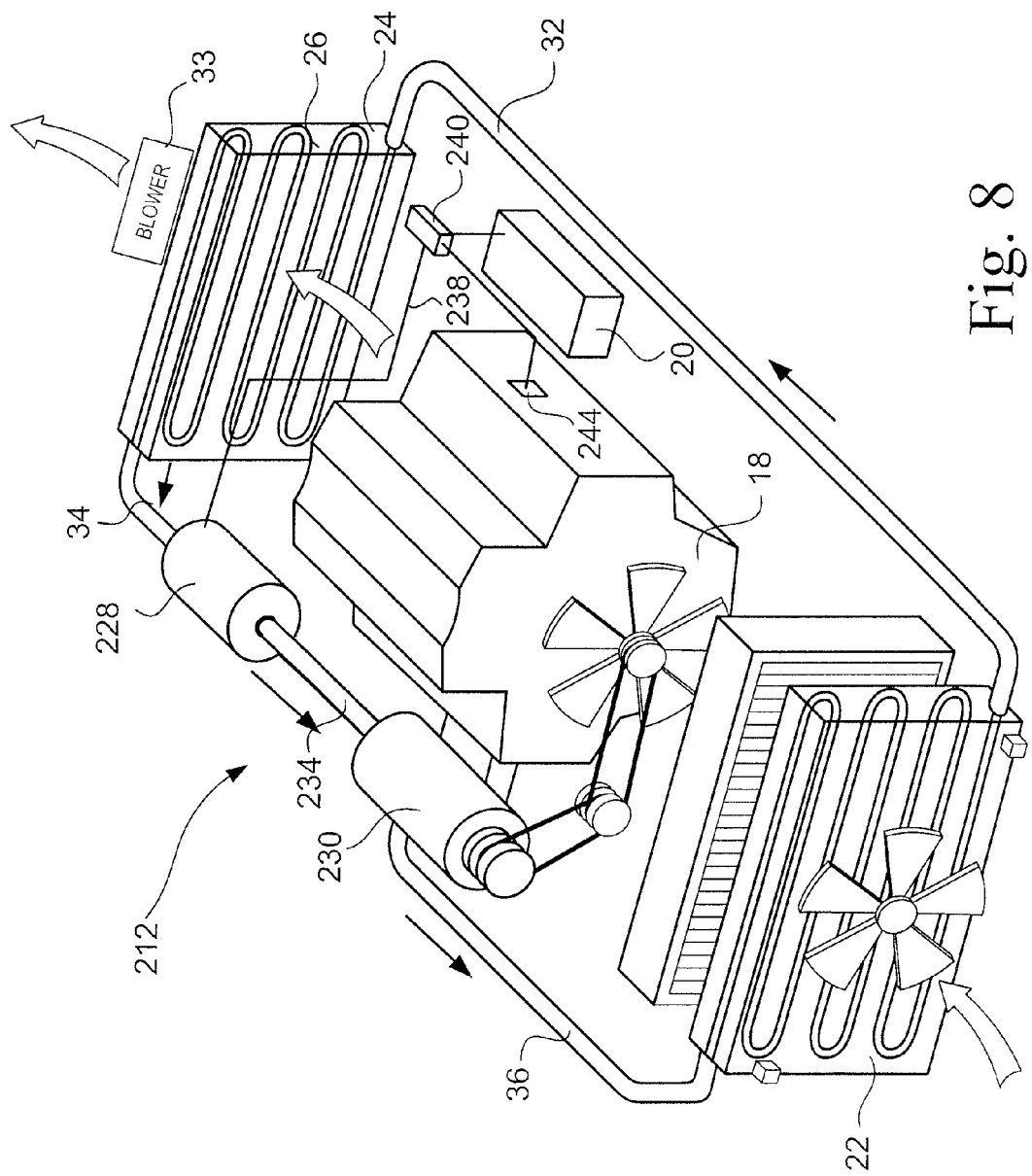
FIG. 8 is a simplified, perspective view of selected portions of an vehicle air conditioning system, similar to FIG. 3, that includes a compressor and a separate refrigerant flow booster in accordance with a fourth embodiment of the present invention.

Referring now to FIG. 8, an air conditioning system 212 in accordance with a fourth embodiment will now be explained. Basically, the air conditioning system 212 is installed in the vehicle 10 of FIG. 1 by replacing the air conditioning system 12 with the air conditioning system 212. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a new reference numeral.

The air conditioning system 212 includes many of the components of the air conditioning system 12 of the first embodiment. For instance, the air conditioning system 212 includes condenser 22, a pressure reducing device 24 and an evaporator 26. However, unlike the first embodiment, the air conditioning system 212 of the fourth embodiment of the present invention includes a refrigerant flow booster 228 and a separate compressor 230. Specifically, the refrigerant flow booster 228 is connected to the evaporator 26 via the low pressure line 34, and the refrigerant flow booster 228 is connected to the compressor 230 via a boost pressure line 234.

The operation of the air conditioning system 212 is the same as the first embodiment except that the refrigerant flow booster 228 is separately powered from the compressor 230. More specifically, the compressor 230 is powered by the engine 18. The refrigerant flow booster 228 includes an internal electric motor (not shown) that is powered by a second power source, such as the battery 20. As shown in FIG. 8, the battery 20 is connected to the refrigerant flow booster 228 by a power line 238.

The refrigerant flow booster 228 can be configured to operate in several different configurations. For instance, the refrigerant flow booster 228 can be configured to operate: only when the air conditioning system 212 is operated; only when the compressor 230 is operated; or can be selectively engaged depending upon any of a variety of conditions. For example, in the fourth embodiment, a controller 240 is provided in the boost pressure line 234 between the battery 20 and the refrigerant flow booster 228. A sensor 244 is mounted on the engine 18 to sense the engine 18 speed (i.e. revolutions per minute or rpm, corresponding to the power output level of the engine 18). When the engine 18 speed (the power output level) falls below a predetermined rpm threshold, the controller 240 causes the refrigerant flow booster 228 to be operated to aid in the flow of refrigerant to the compressor 230. The rpm threshold can be as low as 600 rpm or can be 1200 rpm. The specific rpm threshold is more a function of air conditioning requirements and engine size and the specific range is therefore not a fixed numeric value, but rather is a design and engineering consideration. Preferably, the refrigerant flow booster 228 is operated when the engine 18 is at a relatively low rpm (low power output) when the compressor 230 has a low amount of refrigerant suction power.

It should be understood from the drawings and the description herein that the refrigerant flow booster 228 can be an impellor type pump, a piston type pump or a vane type pump similar to those described in the first, second and third embodiments of the present invention.

Fifth Embodiment

Figure 9:
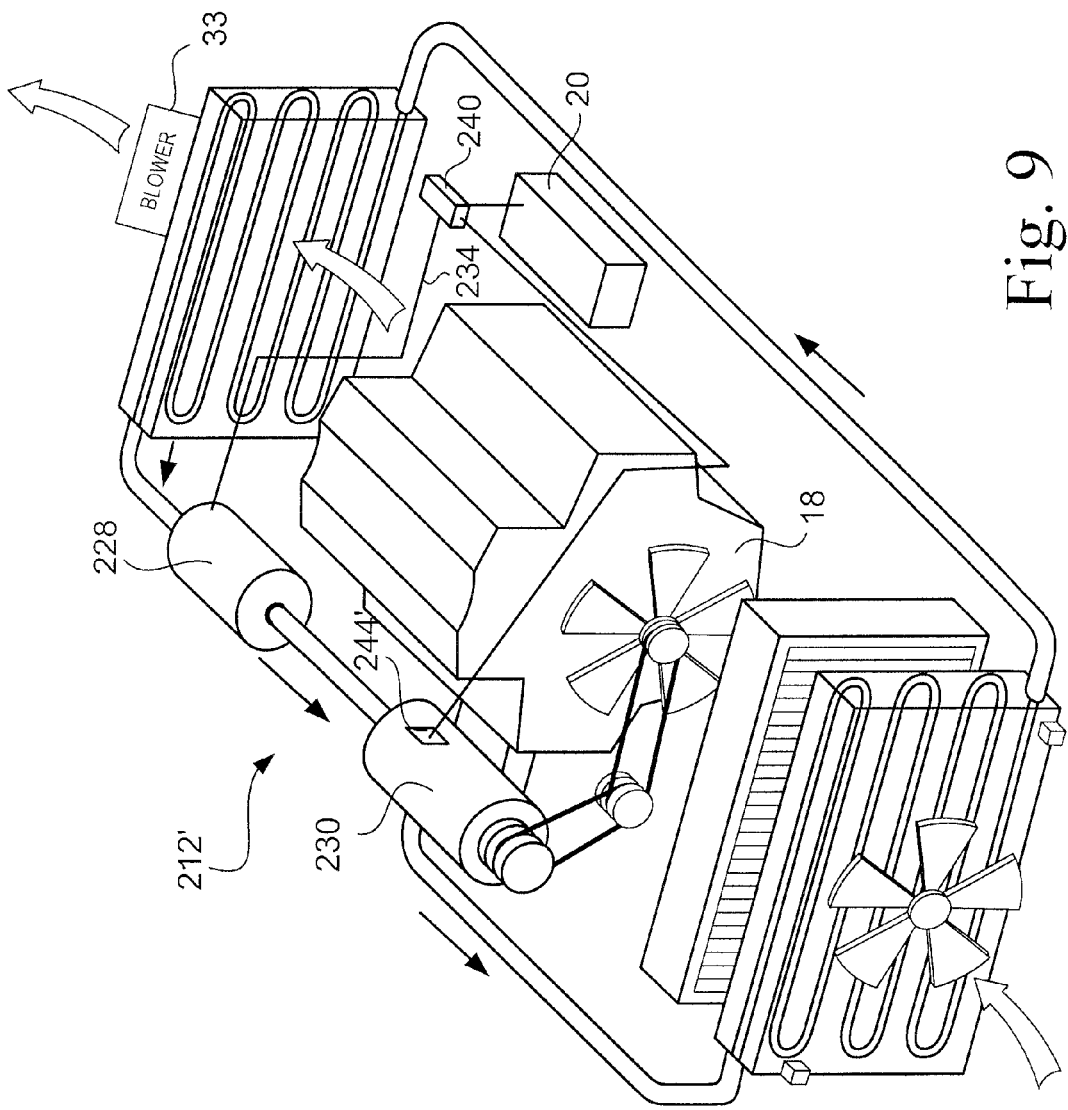
FIG. 9 is a simplified, perspective view of selected portions of an vehicle air conditioning system, similar to FIGS. 3 and 8, that includes a compressor and a separate refrigerant flow booster in accordance with a fifth embodiment of the present invention.

Referring now to FIG. 9, an air conditioning system 212' in accordance with a fifth embodiment will now be explained. Basically, the air conditioning system 212' is installed in the vehicle 10 of FIG. 1 by replacing the air conditioning system 212 with the air conditioning system 212'. In view of the similarity between the fourth and fifth embodiments, the parts of the fifth embodiment that are identical to the parts of the fourth embodiment will be given the same reference numerals as the parts of the fourth embodiment. Moreover, the descriptions of the parts of the fifth embodiment that are identical to the parts of the fourth embodiment may be omitted for the sake of brevity. The parts of the fifth embodiment that differ from the parts of the fourth embodiment will be indicated with a single prime (').

Virtually all features of the fifth embodiment are the same as the fourth embodiment, except for the elimination of the sensor 244. Specifically, the sensor 244 on the engine 18 is replaced by a sensor 244' on or in the compressor 230. The sensor 244' is also connected to the controller 240. The sensor 244' can be configured to detect the speed (power level) of the compressor 230 and causes the controller 240 to selectively turn the refrigerant flow booster 228 on and off in response to the detected speed of the compressor 230. For instance, when the speed (power level) of the compressor 230 falls below a predetermined rpm threshold, the controller 240 causes the refrigerant flow booster 228 to be operated to aid in the flow of refrigerant to the compressor 230. The specific rpm threshold (power level threshold) is a function of air conditioning requirements, compressor capacity and other factors, and therefore the specific range is therefore not a fixed numeric value, but rather is a design and engineering consideration. Preferably, the refrigerant flow booster 228 is operated when the compressor 230 operates at a relatively low rpm (low power output level), i.e., when the compressor 230 has a low amount of refrigerant suction power.

Alternatively the sensor 244' can be configured to detect refrigerant pressure conditions at the inlet of the compressor 230. For example, when the inlet refrigerant pressure drops below a predetermined threshold, the controller 240 can engage the refrigerant flow booster 228. Alternatively other sensors within the air conditioning system 212' can be employed to detect various conditions for engaging and disengaging the refrigerant flow booster 228.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle air conditioning system comprising:
   a condenser being configured to receive a refrigerant in a compressed state and remove heat from at least a portion of the refrigerant;
   a pressure reducing device in fluid communication with the condenser to receive the refrigerant, and configured to reduce pressure of the refrigerant from the condenser;
   an evaporator in fluid communication with the pressure reducing device to receive the refrigerant, and configured to evaporate at least a portion of the refrigerant; and
   a compressor assembly including
      a housing,
      a refrigerant flow booster having an inlet in fluid communication with the evaporator, and configured to boost the pressure of the refrigerant from the evaporator and an outlet refrigerant passageway, and
      a compressor configured to compress the refrigerant and having an outlet to deliver the refrigerant in the compressed state to the condenser, the compressor having an inlet refrigerant passageway,
      the refrigerant flow booster and the compressor being integrally formed as a single unit within the housing, with the outlet refrigerant passageway and the inlet refrigerant passageway being directly connected to one another and contained completely within the housing between the inlet of the refrigerant flow booster and the outlet of the compressor for conveying the refrigerant from a booster chamber of the refrigerant flow booster directly into an interior of the compressor.

2. The vehicle air conditioning system as set forth in claim 1, wherein
   the compressor includes a single drive shaft that supplies rotary power to both the refrigerant flow booster and the compressor.

3. The vehicle air conditioning system as set forth in claim 1, wherein
   the refrigerant flow booster includes an impeller rotor.

4. The vehicle air conditioning system as set forth in claim 1, wherein
   the refrigerant flow booster includes at least one piston.

5. The vehicle air conditioning system as set forth in claim 1, wherein
   the refrigerant flow booster is a vane gas pump.

6. The vehicle air conditioning system as set forth in claim 1, wherein
   the refrigerant flow booster compresses the refrigerant less than the compressor compresses the refrigerant.

7. The vehicle air conditioning system as set forth in claim 1, wherein
   the compressor and the refrigerant flow booster are in fluid communication with one another such that refrigerant flowing from the refrigerant flow booster flows directly to the compressor free of any temperature or pressure altering devices or additional refrigerant flows between the compressor and the refrigerant flow booster.

8. A vehicle air conditioning system comprising:
   a condenser being configured to receive a refrigerant in a compressed state and remove heat from at least a portion of the refrigerant;
   a pressure reducing device in fluid communication with the condenser to receive the refrigerant, and configured to reduce pressure of the refrigerant from the condenser;
   an evaporator in fluid communication with the pressure reducing device to receive the refrigerant, and configured to evaporate at least a portion of the refrigerant;
   a refrigerant flow booster in fluid communication with the evaporator, and configured to boost the pressure of the refrigerant from the evaporator;
   a compressor configured to receive the refrigerant from the refrigerant flow booster, compress the refrigerant, and deliver the refrigerant in the compressed state to the condenser, the compressor being operatively connected to a first power source and the refrigerant flow booster being operatively connected to a second power source such that the booster and the compressor are separately powered, the compressor and the refrigerant flow booster being in fluid communication with one another such that refrigerant flowing from the refrigerant flow booster flows directly to the compressor free of any temperature or pressure altering devices or additional refrigerant flows between the compressor and the refrigerant flow booster; and
   a controller operatively connected to the refrigerant flow booster and the second power source such that power to the refrigerant flow booster is selectively controlled to operate the refrigerant flow booster.

9. The vehicle air conditioning system as set forth in claim 8, wherein
the controller is configured to control the refrigerant flow booster in response to power output level of the first power source.

10. The vehicle air conditioning system as set forth in claim 8, wherein
the controller is configured to control the refrigerant flow booster in response to an operating speed of the compressor.

11. The vehicle air conditioning system as set forth in claim 8, wherein
the refrigerant flow booster and the compressor are separate mechanisms connected by a line.

12. The vehicle air conditioning system as set forth in claim 8, wherein
the refrigerant flow booster includes an impeller rotor.

13. The vehicle air conditioning system as set forth in claim 8, wherein
the refrigerant flow booster includes at least one piston.

14. The vehicle air conditioning system as set forth in claim 8, wherein
the refrigerant flow booster is a vane gas pump.

15. The vehicle air conditioning system as set forth in claim 8, wherein
the refrigerant flow booster compresses the refrigerant less than the compressor compresses the refrigerant.

16. The vehicle air conditioning system as set forth in claim 8, wherein
the first power source is an internal combustion engine of a vehicle.

17. The vehicle air conditioning system as set forth in claim 8, wherein
the controller is configured to operate the refrigerant flow booster in response to detection of the first power source operating below a predetermined power output level and controller is configured such that the refrigerant flow booster is not operated in response to the first power source operating above the predetermined power output level.

18. A vehicle air conditioning system comprising:
a condenser being configured to receive a refrigerant in a compressed state and remove heat from at least a portion of the refrigerant;
a pressure reducing device in fluid communication with the condenser to receive the refrigerant, and configured to reduce pressure of the refrigerant from the condenser;
an evaporator in fluid communication with the pressure reducing device to receive the refrigerant, and configured to evaporate at least a portion of the refrigerant;
a refrigerant flow booster in fluid communication with the evaporator, and configured to boost the pressure of the refrigerant from the evaporator;
a compressor configured to receive the refrigerant from the refrigerant flow booster, compress the refrigerant, and deliver the refrigerant in the compressed state to the condenser, the compressor being operatively connected to an internal combustion engine of a vehicle equipped with the vehicle air conditioning system and the refrigerant flow booster being operatively connected to a second power source such that the booster and the compressor are separately powered; and
a controller operatively connected to the refrigerant flow booster and the second power source, the controller being configured to operate the refrigerant flow booster in response to detection of the internal combustion engine operating below a predetermined power output level and controller being configured such that the refrigerant flow booster is not operated in response to the internal combustion engine operating above the predetermined power output level.

19. The vehicle air conditioning system as set forth in claim 18, wherein
the compressor and the refrigerant flow booster are in fluid communication with one another such that refrigerant flowing from the refrigerant flow booster flows directly to the compressor free of any temperature or pressure altering devices or additional refrigerant flows between the compressor and the refrigerant flow booster.

20. The vehicle air conditioning system as set forth in claim 18, wherein the second power source is a battery within the vehicle.

* * * * *